United States Patent [19]

Bergstrom et al.

[11] 3,863,355

[45] *Feb. 4, 1975

[54] POWER TRANSFER ASSEMBLY

[75] Inventors: Darryl K. Bergstrom, Pacific Palisades; David C. Clark, Los Angeles, both of Calif.

[73] Assignee: Lear Siegler, Inc., Santa Monica, Calif.

[ * ] Notice: The portion of the term of this patent subsequent to June 18, 1991, has been disclaimed.

[22] Filed: Mar. 24, 1972

[21] Appl. No.: 237,845

Related U.S. Application Data

[63] Continuation-in-part of Ser. No. 220,962, Jan. 26, 1972.

[52] U.S. Cl. .................................... 33/324, 33/354

[51] Int. Cl. ............................................ G01c 19/04

[58] Field of Search ......... 33/275 G, 324, 325, 326, 33/327, 354

[56] References Cited

UNITED STATES PATENTS

| | | | |
|---|---|---|---|
| 2,930,240 | 3/1960 | Rellensmann et al. | 33/327 |
| 3,126,746 | 3/1964 | Blitzer et al. | 267/160 |
| 3,512,264 | 5/1970 | Ambrosini | 33/320 |
| 3,545,286 | 12/1970 | Stenstrom | 267/160 |
| 3,648,999 | 3/1972 | Bauer | 267/160 |

*Primary Examiner*—Harry N. Haroian
*Assistant Examiner*—Richard R. Stearns

[57] ABSTRACT

A power transfer assembly is disclosed for electrically interconnecting power supply sources with various operating components of a pendulously supported gyroscope. The gyroscope comprises a cylindrical pendulum rotatively supported about a vertical axis within an outer cylindrical follow-up container. The power transfer assembly comprises a pair of horizontal printed circuit boards in a vertically stacked relationship. A first printed circuit board of the pair extends horizontally across the interior of the pendulum and is attached at both ends to the interior side walls thereof. The second printed circuit board also extends horizontally across the pendulum and through a pair of openings formed in the side walls of the pendulum such that the second board is attached to the interior side walls of the follow-up container.

Four circular power bands are positioned in a horizontal plane and are interconnected at their ends to respective power band mounting posts located on the two circuit boards. Printed circuit leads on the boards, together with selected electrical terminals, complete certain required electrical circuits which include the circular power bands. Three of the bands connect power supplies to the gyroscope spin rotor, the pick-off sensing coils, and the torquer. A fourth band connects these components to an electrical ground.

19 Claims, 8 Drawing Figures

POWER TRANSFER ASSEMBLY

CROSS-REFERENCE TO A RELATED APPLICATION

This application is a continuation-in-part of U.S. Pat. application Ser. No. 220,962, entitled "Circular Connection Bands for a Suspended Body," filed on Jan. 26, 1972.

BACKGROUND OF THE INVENTION

1. Field of the Invention

The present invention relates generally to pendulously supported gyroscopes and more particularly to power transfer assemblies for interconnecting various power supplies with different electrical components associated with the gyroscopes.

2. Description of the Prior Art

Pendulously supported gyroscope have many uses, one of which is being utilized as meridian-seeking instruments. One such instrument is described in U.S. Pat. No. 3,512,264, which issued on May 19, 1970, to the present assignee. As there described, a cylindrical pendulum is rotatively supported about a vertical axis within an outer follow-up container. The pendulum includes a gyroscope rotor mounted therein for rotaition about a horizontal spin axis. As is well known in instruments of this type, the gyroscope rotor tends to align itself with the meridian in response to a precessional torque.

The pendulum described in the afore-mentioned patent also includes an electro-magnetic pick-off assembly having sensing coils for generating signals which are proportional to the angular movement of the pendulum with respect to the follow-up container. These signals are applied to a means for driving the follow-up container, thereby causing the follow-up container to follow the rotation of the pendulum. Pick-off signals, appropriately modified, are also applied to an electromagnetic torquer for developing a counter-torque to oppose the precessional torque of the pendulum. This torque serves to dampen the movement of the pendulum and allows the spin axis of the rotor to arrive at the meridian with substantially zero velocity and therefore very little, if any, overshoot.

In the afore-mentioned patent, power for operating the components located within the pendulum is transferred through a pair of vertically-oriented spring-loaded power bands. These power bands are in the form of semi-circles in the longitudinal plane. Although these power bands have been considered optimum in that parasitic torques normally resulting from such power bands are eliminated, the spring constant of the vertical power band assembly is in the order of 16 dyne cm. per radian, which is unacceptably high for today's stringent accuracy requirements of small lightweight merdian seeking instruments. Furthermore, the vertical power band configuration of necessity lengthens the suspension band. We have discovered that a shorter suspension band reduces the overall spring constant for the entire instrument and provides distinct advantages.

In our parent U.S. patent application mentioned hereinbefore, at least one pair of horizontally mounted circular bands are described and claimed. In this present application, we improve upon our earlier invention by providing at least two pairs of power bands with one band of each pair mounted on one of the printed circuit borads. The two horizontal printed circuit boards are transversely oriented with respect to each other and serve both as mechanical mounting structures for the power bands and further serve as a combined electrical conductive and electrically insulative material as will be explained in greater detail hereinafter.

SUMMARY OF THE INVENTION

The present invention provides a novel power transfer assembly for pendulously supported gyroscopic instruments.

In its broadest aspect, the power transfer assembly comprises a pair of vertically stacked transverse printed circuit boards lying in horizontal planes. The first circuit board is attached to the pendulous body supporting the gyroscope while the second circuit board is attached to the follow-up container enveloping the pendulous body. Two pairs of connecting bands, all concentrically positioned in horizontal planes, are interconnected, at their ends, to the two circuit boards. Each connecting band comprises a circular segment extending between 270° and 360°. The bands are further characterized in that one pair of bands is inverted with respect to the other pair of bands to define opposed circular arcs.

A primary advantage of the present invention is that the opposed arcuate bands are counter-acting to maintain the overall spring constant at a fixed level throughout the normally encountered minute rational movements of the pendulum. Moreover, this band configuration provides an extremely low spring constant which is a necessity for highly delicate instruments.

Another advantage of the present invention is that different levels of current can be transferred over the bands to drive various components of the pendulous instrument. For example, the two bands carrying the high level of current to and from the gyroscope spin rotor are arranged in an opposite counter-acting pair. As a result, any change in the individual spring constant of one band, due to heat caused by the high current level, is matched in the counter-acting band. Therefore, these temperature changes cancel out each other and the overall balance for the spring constant is maintained.

Still another advantage of the present invention is that the two boards along with the power bands are adapted to be interlocked to prevent any damage to the power bands during installation. This also enables the power band assembly to be easily inspected prior to installation.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
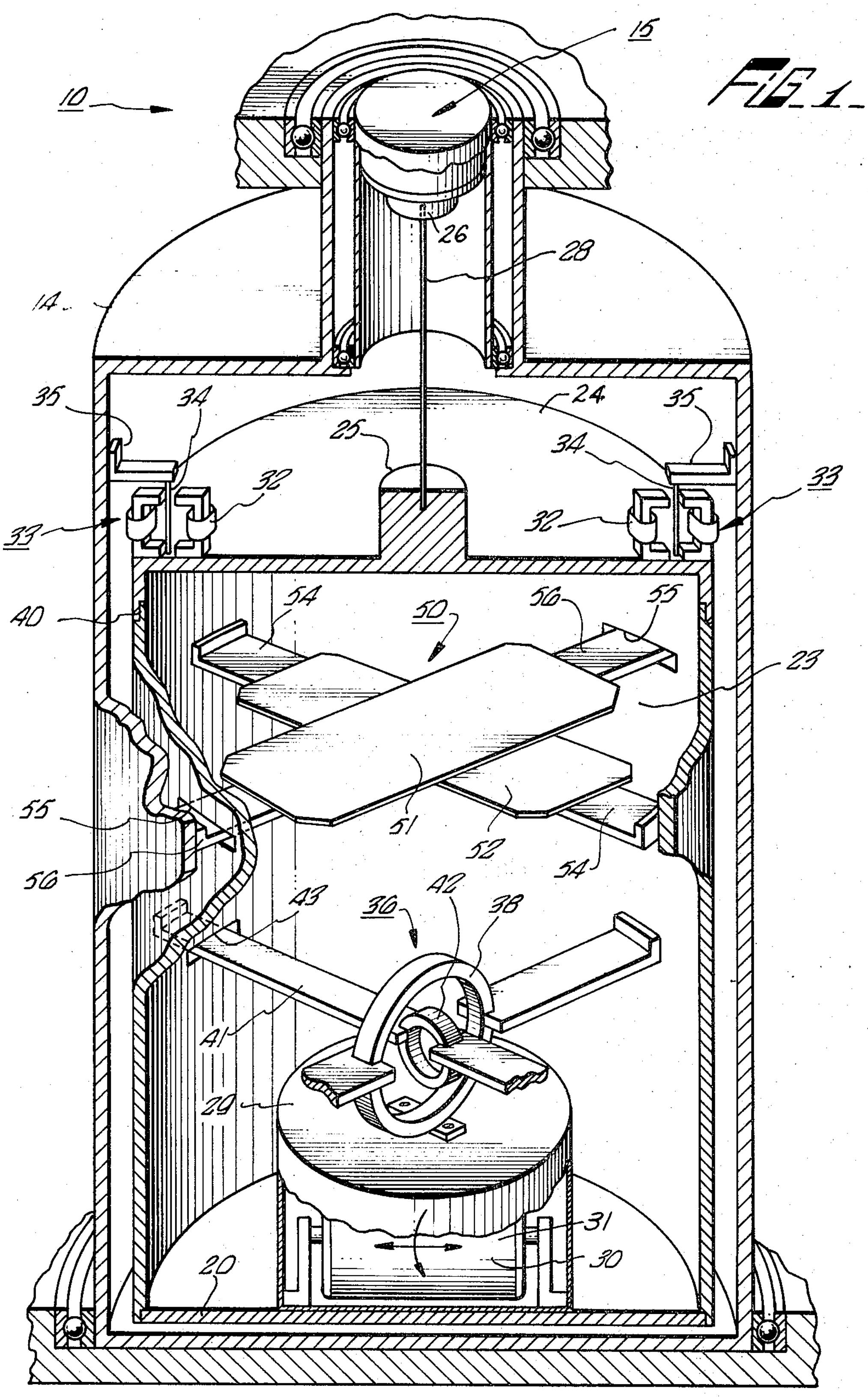
FIG. 1 is illustrative side elevation of a meridian seeking instrument utilizing the power transfer assembly of the present invention.

Referring now to the drawings, FIG. 1 illustrates in diagramatic form a meridian-seeking instrument, generally indicated by arrow 10. Reference may be made to U.S. Pat. No. 3,512,264 for detailed description of a suitable outer housing, a mounting tripod and other circuitry details discussed hereinafter as are typical for the meridian-seeking instrument of the U.S. patent. In that patent, for example, a follow-up container such as container 14 is described. Basically the follow-up container 14 rotates as the pendulous gyroscope 15, housed within the container 14, precesses due to the spinning high speed rotor and the earth's rotation.

Located within the follow-up container 14 is pendulum 23 having a mounting plate 24 formed on the top end thereof for receiving a suspension band clamp 25. Another suspension band clamp 26 is also mounted on the upper extremity of the meridian-seeking instrument 10. The suspension band 28 rotatively supports pendulum 23 about the vertical axis.

The lower interior portion of the pendulum 23 is adapted to receive an electrically driven gyro spin rotor 30 which is adapted to rotate about a horizontal spin axis 31. A spin rotor shield 29 extends over gyro 30.

A pair of pick-off assemblies 32 is provided to sense the relative angular displacement of the pendulum 23 with respect to the follow-up container 14. Each pick-off assembly 32 may comprise an electromagnet 33 having a coil 34 positioned in the air gap. The coal 34 is held in position in the air gap by a bracket 35 mounted on the interior wall of the follow-up container 14. Each pick-off assembly 32 is wound with an energized coil in such a manner that if the sensing coil 34 is displaced slightly with respect to its initial null position in the electromagnet 33, an electro-motive force is developed in the sensing coil 34 and a pick-off error signal is generated.

A torquer assembly 36 is also located within the pendulum 23. The torquer assembly 36 comprises an outer annular coil ring 38 fixedly mounted to the shield 29. Within the opening of the coil ring 38 is a similar annular coil 42, which has its vertical transverse to the vertical plane of coil 38. This inner annular coil 42 has an outer diameter slightly less than the inner diameter of the coal ring 38, and is free to move relative thereto. The annular coil 42 is connected to brackets 41 which extend, at both ends, through a pair of apertures 43 formed in the sidewalls of pendulum 23 in order to be attached by any conventional means to the interior sidewalls of the follow-up container 14.

In accordance with the present invention, electrical energy from exterior power supplies is transferred to the various components on the pendulum 23 by means of a power band assembly 50. As shown in FIG. 1, the power band assembly 50 comprises a pair of horizontal printed circuit boards 51 and 52 located within the pendulum 23 in a vertically stacked relationship. The first circuit board 52 extends horizontally across the pendulum 23 and is attached to the interior sidewalls thereof. Circuit board 52 may be connected to pendulum 23 by any conventional fastening means such as a pair of blocks 54, mounted on the pendulum sidewalls.

The second circuit board 51 also extends horizontally across the pendulum 23 and is adapted to extend through a pair of apertures 55 formed in the pendulum sidewalls for attachment to the interior sidewalls of the follow-up container 14. Circuit board 51 also includes a pair of blocks 56 or any other conventional means for mounting it to the sidewalls of the follow-up container 14.

As shown in detail in FIG. 2, each board 51 and 52 also includes printed leads, power band mounting posts and connector terminals which form electrical circuits described in greater detail hereinafter with respect to FIG. 6. The boards 51 and 52 are positoned in such a manner that printed leads of each board are located on the board sides facing each other. On board 51, the leads, on the lower side of the board, are electrically connected at one of their ends to a pair of power band mounting posts 57 and 58 extending from the upper side of the board.

Figure 2:
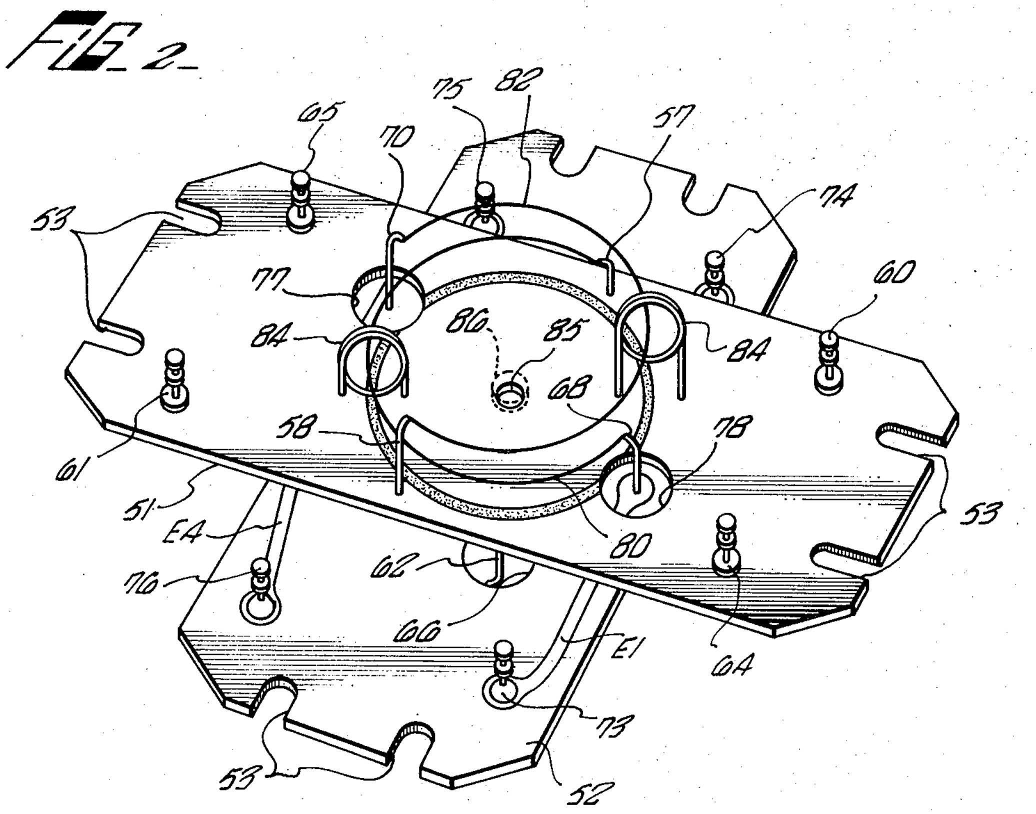
FIG. 2 is a perspective view of the power transfer assembly of the present invention.
Figure 4:
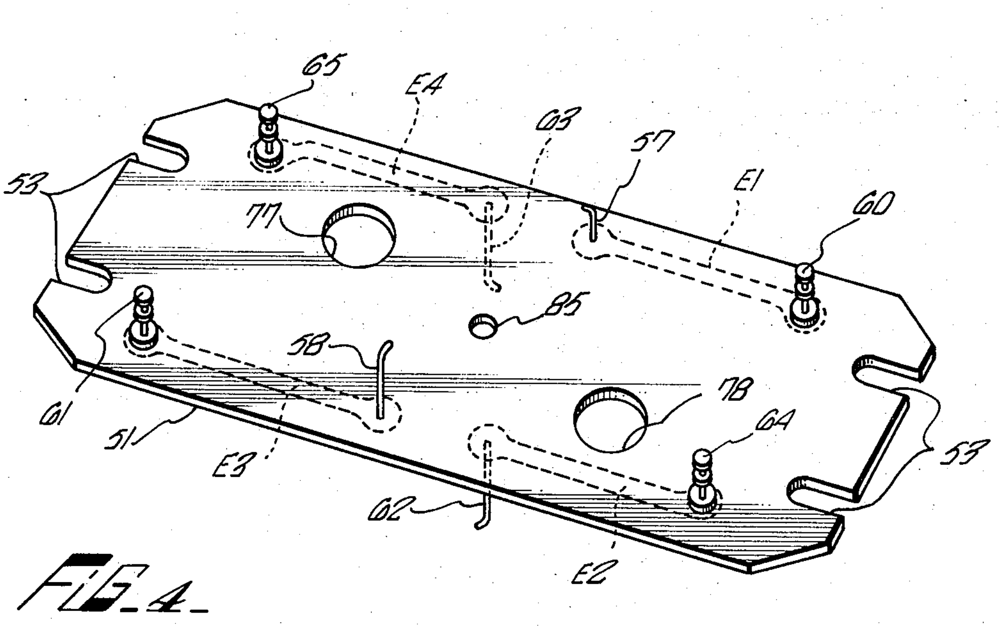
FIG. 4 is a perspective view of one of the printed circuits boards utilized in the power transfer assembly.
Figure 5:
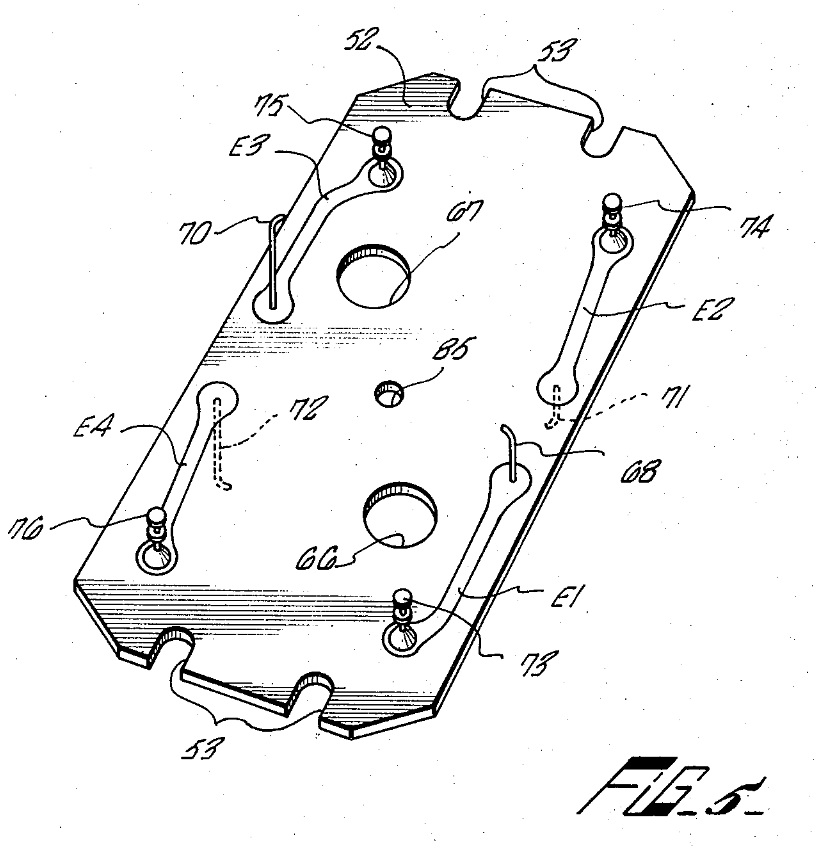
FIG. 5 is a perspective view of the other printed circuit board utilized in the power transfer assembly.

FIGS. 4 and 5 show the boards of FIG. 2 in exploded and detached elevational views. The four power bands 80 to 83 are not shown in FIGS 4. and 5 for ease of viewing and understanding. As shown in FIG. 4, power band post 57 extends through board 51 for electrical connection (as by dip soldering or by any other conventional means) to a printed circuit lead E1. An electrical terminal 60 is also electrically connected to lead E1. Terminal 60 extends from the bottom of board 51 out the upper surface thereof where it is available for an electrical connecting wire to be described in greater detail in connection with the description of FIG. 6. In a similar manner, as shown in FIG. 4, post 58 is connected to printed circuit lead E3 and to electrical terminal 61 to form another portion of a differnt electrical circuit.

Returning for a moment to FIG. 2, a power band 80 connects power band post 57 (of board 51) to another power band post 68 (of board 52), which post 68 protrudes through an aperture 78 located in board 51. Similarly power band 82 is mounted on mounting post 58 (board 51) and extends in a circular arc to another power band mounting post 70 (board 52), which post 70 extends through an aperture 77 located in board 51.

Returning again to FIG. 4, two additional printed circuit leads E2 and E4 are shown on the lower surface of board 51. These leads E2 and E4 are connected at one of their ends to a pair of posts 62 and 63 extending downwardly from the lower surface of board 51. The other ends of the leads E2 and E4 are connected to a pair of teminals 64 and 65 located on the upper side of board 51. When the two boards are positioned in the manner shown, in FIG. 3, two apertures 66 and 67 are provided on the board 52 for enabling the posts 62 and 63 to extend therethrough.

On board 52, FIG. 5, similarly designated leads E1 and E3, located on the upper side of the board 52, are connected at their one ends to a pair of posts 68 and 70 located on the same side thereof. At this point in the description it is clear that printed circuit leads E1 through E4 on board 51 are electrically connected to similarly desginated printed leads E1 through E4 on board 52 and vice-versa. The power band mounting posts thus mount and interconnect the respective leads of the board via four power bands 80, 81, 82, and 83. For example, as shown in FIG. 2, power band 80 is utilized to interconnect the leads E1 of the board 51 and 52 via the posts 57 and 68, while the power band 81 functions to interconnect the leads E2 of the two boards 51 and 52 via posts 62 and 71. In like manner, the power band 82 interconnects the leads E3 of the two boards 51 and 52 via posts 58 and 70, while the band 83 interconnects the leads E4 of the two boards 51 and 52 via posts 63 and 72.

Figure 6:
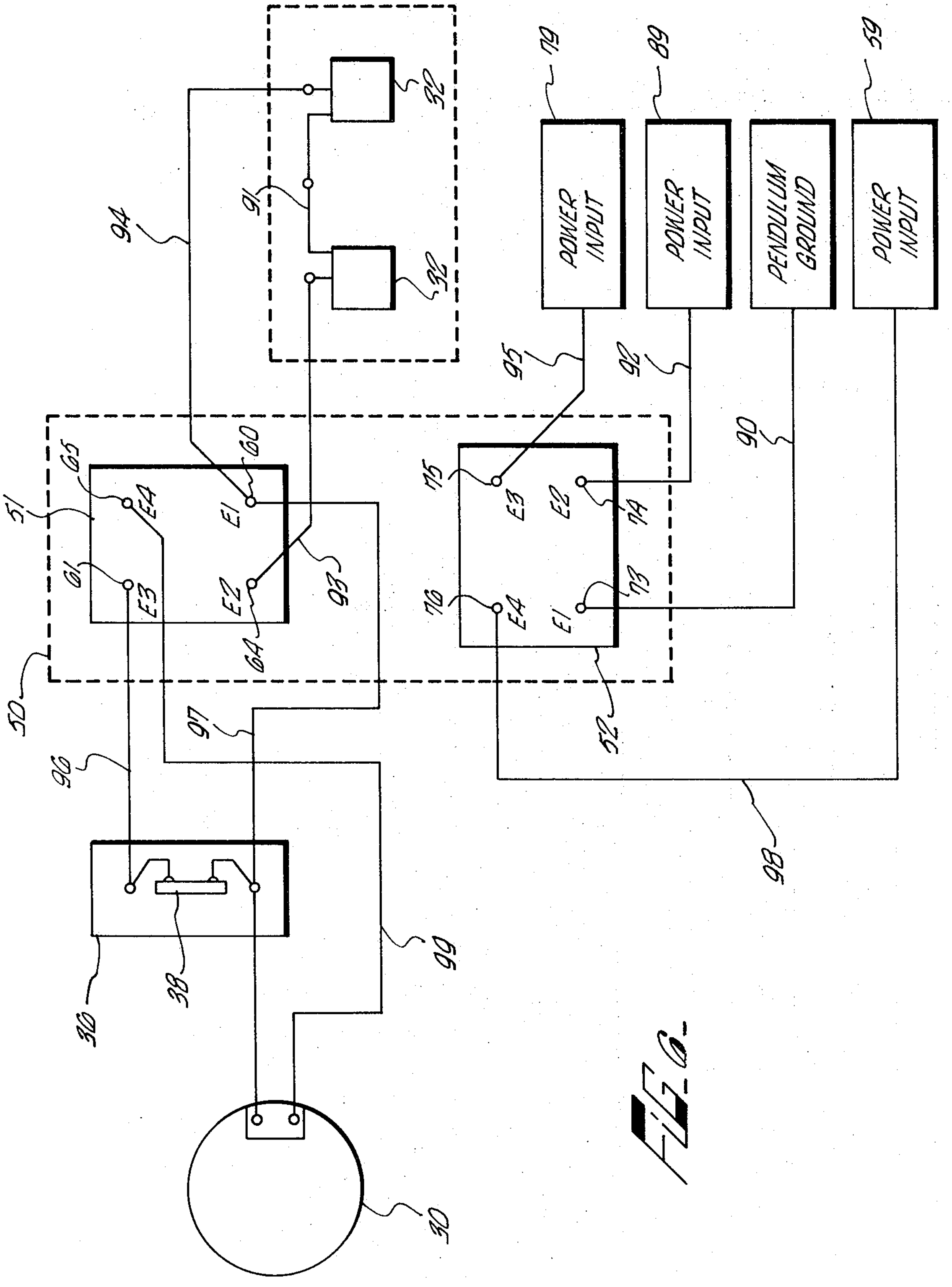
FIG. 6 is a wiring schematic showing electical connections for various components of the meridian seeking instrument.

Having described the power band connections to their associated posts, the printed circuit leads and the power bands are not depicted in FIG. 6. Boards 51 and 52 are shown within the dashed line assembly 50 for completing electrical circuits between electrical, or pendulum, ground and three exemplary power supply inputs 59, 79, and 89. These three input sources may, of course, be any suitable direct or alternating current input sources in keeping with the operational characteristics of any of either: (a) the pick-off excitation coils (shown as pair 32 within dashed lines); (b) the outer torquer coil 38; or (c) the spin rotor 30. As described earlier, the pair of excitation coils 32 associated with the pick-off assembly form a simple direct current electromagnet. In a similar manner, the outer torquer coil 38 establishes a direct current magnetic field, which field interacts with a variable magnetic field of the inner torquer coil 42, FIG. 1. This inner annular coil 42 receives signals from the pick-off coil 34 positioned in the air gap of the pick-off assembly 32 and operates in the manner described hereinbefore in connection with FIG. 1. The circuit boards 51 and 52 are used in establishing the magnetic fields for both the pair of excitation coils 32 of the pick-off assembly and for the outer torquer coil 38. Accordingly, the power input source 89, FIG. 6, is assumed to be a direct current source of a selected magnitude for the excitation coil pair 32. A path between the input source 89 through the excitation coil pair 32 will now be described. A ground connection is made via wire 90, which may be any suitable electrical lead to the printed circuit E1 on the board 52 via terminal 73. Terminal 73, in turn, is electrically connected via post 68, power band 80, post 57 (FIG. 2) to the printed circut E1 on board 51. Electrical terminal 60 receives wire 94 for applying ground to one side of the pair of excitation coils 32. Wires 91 and 93 are also connected to excitation coils 32 and to terminal 64 through printed circuit E2 of board 51. Power band 81, post 71, and terminal 74 of printed circuit E2 on board 52 complete an electrical supply circuit for the excitation coils 32 between ground and the power input source 89 which is connected to terminal 74 of board 52 by wire 92.

The outer, or reference, torquer coil 38 may require a magnetic field of different strength than that of excitation coil pair 32. Accordingly, another direct current power input source 79 is shown in FIG. 6. Current from power input source 79 is supplied to the torquer coil 38 via line 95 to terminal 75 associated with printed circuit E3 on circuit board 52. Power band 82 transfers the direct current to terminal 61 of printed circuit E3, board 51, to one side of torquer coil 38. Wire 97 connects the opposite lead of torquer coil 38 with terminal 60 and thus to pendulum ground in order to complete the electrical circuit.

For spin motor 30, alternating current may be utilized. Such current is supplied form a current source 59 to the spin motor 30 via line 98 to the lead E4 on the circuit board 52. The current is then conducted through the power band 83 to the lead E4 on the circuit board 51 and finally to the spin motor via line 99. The line 97 is also utilized to connect the spin motor 30 to the ground lead E1 to complete the electrical circuit.

As is well known, the precessional torque which tends to align the spin axis of rotor 30 with the meridian is small. Accordingly, every effort must be made to eliminate all random torques and to provide a simple and easily manufactured unit. In accordance with the present invention, the power band assembly is configured to eliminate any parasitic torques emanating therefrom. In keeping with these general objectives, certain features are utilized in our invention. For example, the terminating lengths of the various power band mounting posts are dimensioned so that associated posts all terminate in a common plane. This dimensioning enables their respective power bands to lie in parallel horizontal planes.

Figure 3:
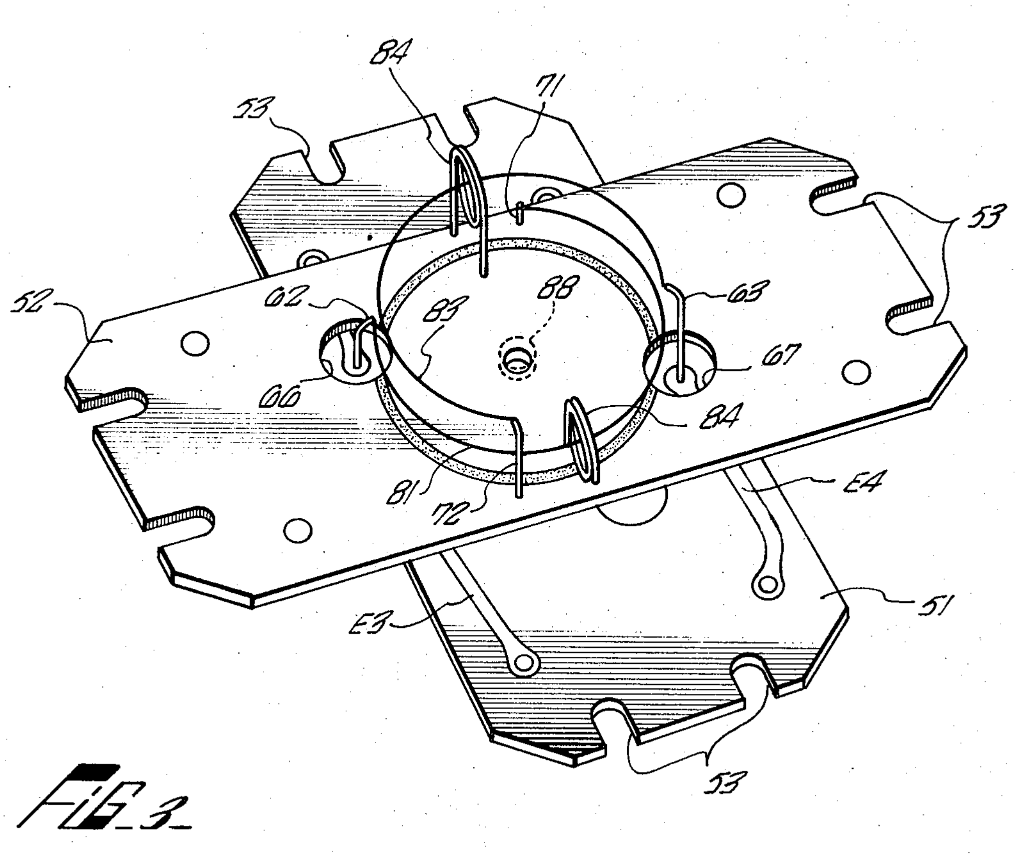
FIG. 3 is a perspective view of the power transfer assembly showing the bottom sides thereof.

In addition, rings 84 are insulatively mounted on the boards 51 and 52 as shown in FIGS. 2 and 3. Rings 84 prevent the bands from becoming entangled with each other. Rings 84 also prevent a given power band from touching posts that are in an electrical circuit other than its own. Such rings have proven of great value in qualifying our meridian seeking instrument for the severe vibration tests which such units must undergo.

The centers of the two boards 51 and 52 are provided with bores 85 for receiving a fastening assembly 86 which comprises a threaded screw 86 (shown in broken lines). A spacer (not shown) is adapted to be mounted on the screw 86 between the boards 51 and 52 to maintain the boards 51 and 52 at a fixed distance apart. A nut 88 (shown in broken lines) is adapted to be threaded to the bottom end of the screw 86 to secure the assembly in the fixed position. Referring momentarily to FIG. 1, the inner container shows a junction point 40 at its upper extremity. A similar junction 20 is present at the bottom of the container. These junctions may be threaded or fastened by any conventional means. Such junctions are extremely useful in the method of assemblying our meridian seeking instrument. For example, the various mountings for circuit boards 51 and 52 may be fastened in place with high accuracy during installation. Thereafter, the interlocking means may be removed and the boards are free to move relative to one another within pendulum 23 and follow-up container 14 during the precessing operation described earlier.

An additional protection is provided in our invention by keeping the total spring constant for the meridian seeking instrument at a low value. Reference to our U.S. parent application computes certain spring constants which are equally applicable for this invention. Thus, power bands 80, 81, 82 and 83 form circular segments located in a horizontal plane and arranged in pairs with the first pair being inverted with respect to the second pair.

Because of this inversion, when the pendulum 23 and its attached circuit boards 51 rotates about the vertical axis in one direction, one pair of bands will move in a manner to form circular arcs of slightly larger diameter than formed at the rest or zero position. In the same instant, in counter-action to the movement of the first pair of bands, the second pair of bands forms a circular arc of slightly smaller diameter than formed at the rest position. Accordingly, these counter-acting movements produce counter-acting torques which effectively cancel each other over the normally minute degrees of arc through which the pendulum 23 rotates with respect to the follow-up container 14.

Figure 7:
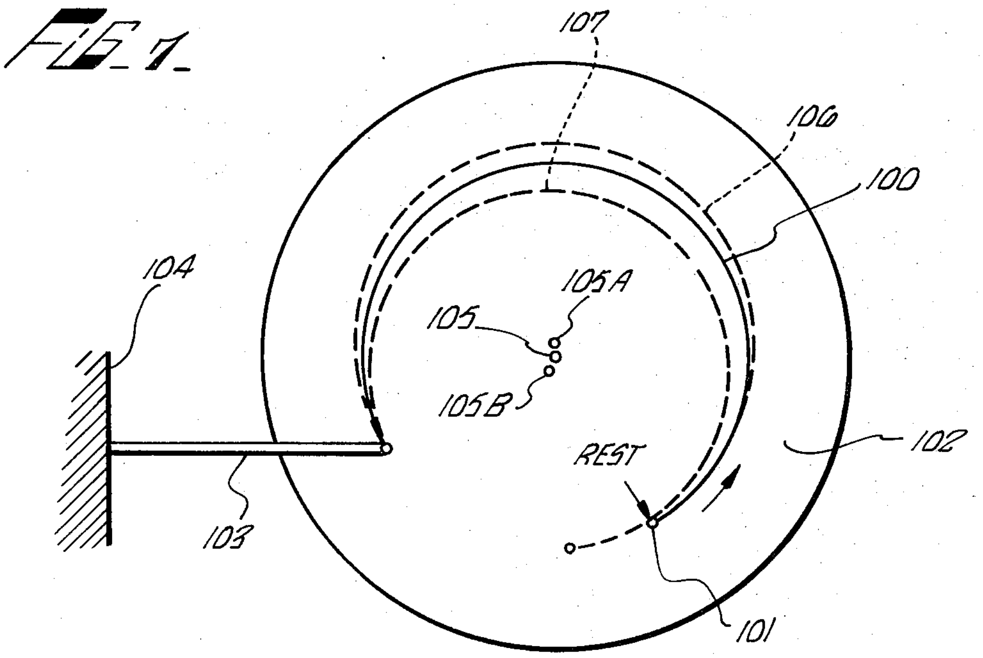
FIG. 7 is a plan view depicting the various movements of one connecting band.

For exemplary purposes, reference is made to FIG. 7 (FIG. 2 of our earlier-filed parent application) which depicts a top view of a single power band 100 identical in structure to any of the power bands 80, 81, 82, or 83. The power band 100 is connected at one end to a mounting post 101 located on a suspended body 102 (pendulum 23), and at the other end to a mounting post 103 mounted on a relatively fixed body 104 (follow-up container 14). The solid line in FIG. 7 is the normal circular configuration for the band 100 at the rest position of the suspended body 102. The center of the segment at rest position is point 105. The two dashed lines represent the circular changes in the band 100 through its entire length as the suspended body 102 rotates back and forth past the initial rest position. As the body 102 is moved in a counter-clockwise direction, the mounting post 101 moves further away from the post 103 and the band 100 forms an expanded circular segment with a center point located approximately at 105A (show by dashed line 106). On the other hand, as the suspended body 102 moves back past the rest position, the mounting post 101 moves closer toward post 103. The band 100, throughout its length, forms a contracted circular segment shown, for example, by the inner dashed lines 107 with a center point 105B.

Figure 8:
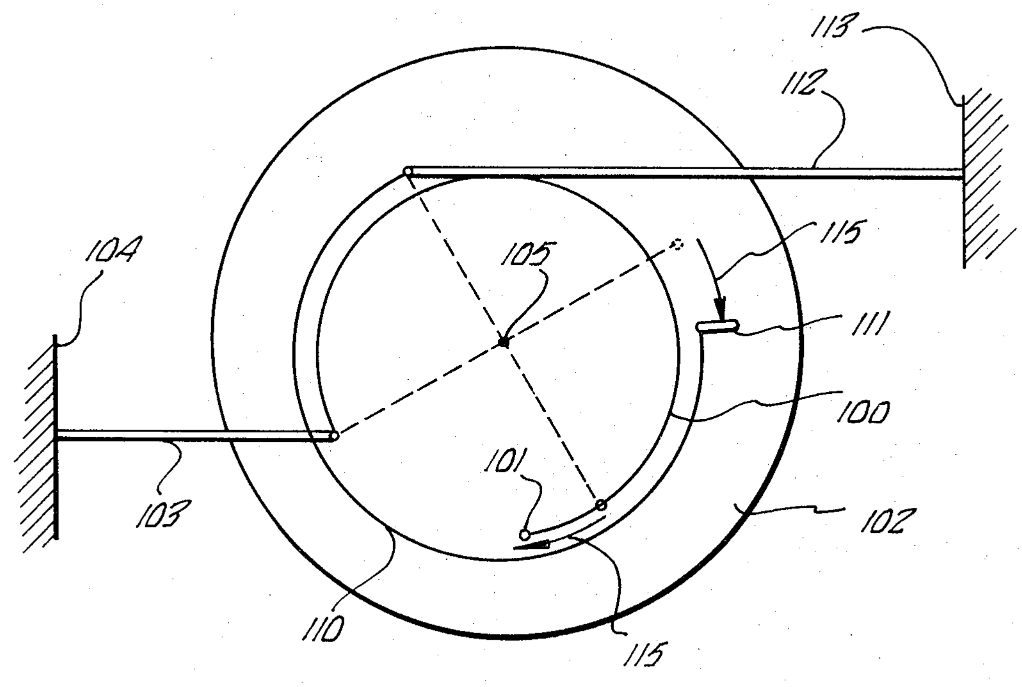
FIG. 8 is a plan view depicting the counter-acting movements of two opposed connecting bands.

As stated previously, the two pairs of bands are mounted in opposition. As such, the mounting posts of both pairs of band always move in opposite directions for any relative movement of the pendulum 23 with respect to the follow-up container 14. This movement is illustrated in the example given above and is shown in FIG. 8 (FIG. 3 of our parent application) where an opposed ban 110 is connected at one end to post 111 of the suspended body 102, and at the other end to post 112 of a fixed body 113. As illustrated in FIG. 8, as the mounting posts for band 100 move closer together, the mounting posts for band 110 move further apart. The important point to be noted is that for any given arc of rotation, each band is bent initially an equal amount throughout its entire length. Both bands of the pair of bands move in opposition in such a manner that the torques exhibited by each on the body 102 cancel each other out. Both bands 100 and 110 are shown when the suspended body has rotated in a clockwise direction an amount shown by the arrows 115. At rest position, the band 100 and 110 would be two coaxial circular segments of approximately 270°. Dashed lines 116 show the two equal and vertical 90° angle at which the mounting means meet the rest circular segments.

Although very large arcs of rotation have been assumed, in many instances such arcs are very minute, amounting only in the order of a few seconds of a degree. In either event, however, the connection bands of the present invention provide an extremely low spring constant that helps maintain the suspended body at its normal rest position and operates to cancel out any unbalanced torques as the body rotates.

Moreover, as more thoroughly described in the above-mentioned U.S. Pat. application Ser. No. 220,962, of which this application is a continuation-in-part, the spring constant for a power band configuration of this type is extremely low. This also allows the pendulum to rotate back and forth through its normal period without any unbalanced or parasitic torque being present which would adversely affect the normal periodicity of the rotational movement.

Another advantage of the horizontally oriented power bands is that the entire unit including the suspension band 28 can be shortened in comparison to the prior art devices having vertically oriented power bands.

The apparatus is also characterized in that the current source for the spin motor 30 is higher than for the torquer assembly 36 or the pick-off assembly 32. Because the high current level for the spin motor can raise the temperature of the power bands transmitting this current and affect the physical properties (including the spring constants) thereof, the power bands are arranged to have the two bands forming the spin motor circuit located in opposite pairs. Therefore, as shown in the FIGURES, the power band 80 connecting the spin motor 30 to ground is always in the opposite pair with respect to the power band 83 which supplies the current to the spin motor 30. As a result, the spring constants of counter-acting power bands 80 and 83 will be affected equally, thereby canceling out the effects of the temperature build-up.

As can be seen, an improved power transfer assembly is provided for supplying power to various components on a pendulous body. It should be noted that various modifications can be made to the apparatus while still remaining within the purview of the following claims.

What is claimed is:

1. In a pendulously supported gyroscope assembly having an exterior housing, a power supply exterior of said housing and means suspending said gyroscope assembly in said exterior housing for rotational movements about a vertical axis, the improvement comprising a power transfer assembly means for electrically interconnecting said power supply source with said gyroscope assembly including:

two pairs of flexible electrically conductive connection bands of an electrically conductive material lying in parallel planes that are transverse to said vertical axis, with each band comprising an arcuate circular segment with a portion of a full circle removed so that each arcuate band comprises less than a full circle and more than a semi-circle with their centres of curvature lying on vertical axes, at least one of said respective bands being electrically connected to said power supply;

means for operatively connecting one end of each band of said pairs of bands to said gyroscope assembly; and means for operatively connecting the other end of each band of said pairs of bands to said exterior housing, the bands being further characterized in that one pair of bands is inverted with respect to the other pair of bands to define opposed circular arcs whereby any forces created by flexure of said bands during operation of the gyroscope assembly are substantially counter balanced.

2. The invention of claim 1 wherein each band comprises a circular segment substantially between 270° to 360°.

3. The invention of claim 1 wherein as said gyroscope assembly rotates one of said bands assumes the shape of an expanded circular arc and another of said bands assumes the shape of a contracted circular arc.

4. The invention of claim 1 wherein the means for connecting each band to said gyroscope assembly include a board member and at least two mounting posts.

5. The invention of claim 4 wherein the means for connecting each band to said exterior housing include a second board member and at least a second pair of mounting posts, each board member including at least one aperture having at least one mounting post extending through said aperture.

6. In a pendulously supported gyroscope assembly, the improvement comprising a power transfer assembly for electrically interconnecting an exterior power supply source with various components located on said pendulously supported gyroscope assembly, said power transfer assembly further comprising:

a first printed circuit board, lying in a horizontal plane attached to the pendulous gyroscope assembly;

a second printed circuit board, lying in a horizontal plane, attached to an exterior housing; and two pairs of flexible electrically conductive power bands concentrically positioned in parallel horizontal planes, each band comprising a circular segment extending between 270° and 360°, and being interconnected at one end to said first circuit board and at the other end to said second circuit board, the bands being further characterized in that one pair of bands is inverted with respect to the other pair of bands to define opposed circular arcs.

7. The invention of claim 6 wherein two of said bands are located on one side of the pair of circuit boards and the other two bands are located on the opposite side of said circuit boards.

8. The invention of claim 6 wherein said power bands are connected at their ends to mounting posts respectively mounted on both circuit boards.

9. The invention of claim 8 wherein said mounting posts are conductively connected to terminals located on said boards.

10. The invention of claim 8 wherein two mounting posts from each circuit board extend through apertures substantially larger than the cross-sectional area of said posts formed in the other circuit board.

11. The invention of claim 10 wherein the other two mounting posts from each circuit board are mounted perpendicular with respect to said circuit board, extending in a direction away from said other circuit board.

12. The invention of claim 6 further comprising means for limiting the vertical movement of each band.

13. The invention of claim 12 wherein said limiting means comprises a plurality of insulated rings vertically mounted on said circuit boards, each ring adapted to extend around a respective power band.

14. A power transfer assembly for connecting various components in a meridian-seeking instrument to at least one source of electrical power and to electrical ground, said meridian-seeking instrument comprising a pendulum suspended within a follow-up container, said pendulum having an electrically driven spin rotor mounted therein, and electro-magnetic pick-off assembly and an electro-magnetic torquer, said power transfer assembly comprising:

a first printed circuit board, lying in a horizontal plane within the pendulum and attached to the interior walls thereof;

a second printed circuit board, lying in a horizontal plane within the pendulum, said board extending through enlarged openings formed in the wall of the pendulum for attachment with the follow-up container; and two pairs of electrically conductive bands, all concentrically positioned in parallel horizontal planes, interconnecting the two circuit boards, each band comprising a circular segment extending between 270° and 360°, and interconnected at one end to said first circuit board and at the other end to said second circuit board, the bands are further characterized in that one pair of bands is inverted with respect to the other pair of bands to define opposed circular arcs.

15. The invention of claim 14 wherein the four connecting bands comprise a first band which electrically interconnects one power source with the spin rotor of said gyroscope, and a second band which electrically interconnects the electrical components including the spin rotor in the pendulum with electrical ground, said first and second bands being located in opposite pairs in order to be inverted with respect to one another.

16. The invention of claim 15 wherein the four bands comprise third and fourth bands which electrically connect the pick-off assembly and the torquer, respectively, to a second source of power.

17. A power transfer assembly for electrically interconnecting a power supply source with a pendulum vertically suspended with an outer body, said assembly comprising:

a first printed circuit board, lying in a horizontal plane intersecting the vertical rotational axis of the pendulum, said circuit board attached to the pendulum;

a second printed circuit board, lying in a horizontal plane intersecting the vertical rotational axis of the pendulum, said circuit board attached to the outer body;

at least two arcuate bands, whose centers of curvature lie on vertical axes, each band having one end connected to said first circuit board and the other end connected to said second circuit board; and means for detachably interlocking said first and second circuit boards to permit installation of said power transfer assembly.

18. The invention of claim 17 wherein said interlocking means comprises fastening means extending through said circuit boards at apertures formed therein along said vertical axis.

19. A power transfer assembly for electrically interconnecting a power source to a pendulum in proximity of a relatively fixed point, which pendulum contains at least one electrical component requiring power, said assembly comprising:

a first printed circuit board including a printed circuit lead and lying in a horizontal plane intersecting the vertical rotational axis of the pendulum, said circuit board attached to the pendulum;

a second printed circuit board including a printed circuit lead and lying in a horizontal plane intersecting the vertical rotational axis of the pendulum, said circuit board attached to the fixed point in a manner allowing said pendulum to rotate substantially free of interference from said second board;

at least two electrically conductive arcuate bands, whose centers of curvature lie on a vertical axis, each band having one end connected to said first circuit board and the other end connected to said second circuit board;

means on said printed circuit boards for at least partially completing electrical circuits through said bands to said component from said source; and terminal means on said boards electrically connected to said printed leads and having means for receiving electrically conductive leads for completing said electrical circuit.

* * * * *